Jan. 21, 1958  J. DOLZA ET AL  2,820,340
TURBOJET ENGINE FUEL AND NOZZLE CONTROL SYSTEM
Filed Dec. 30, 1952
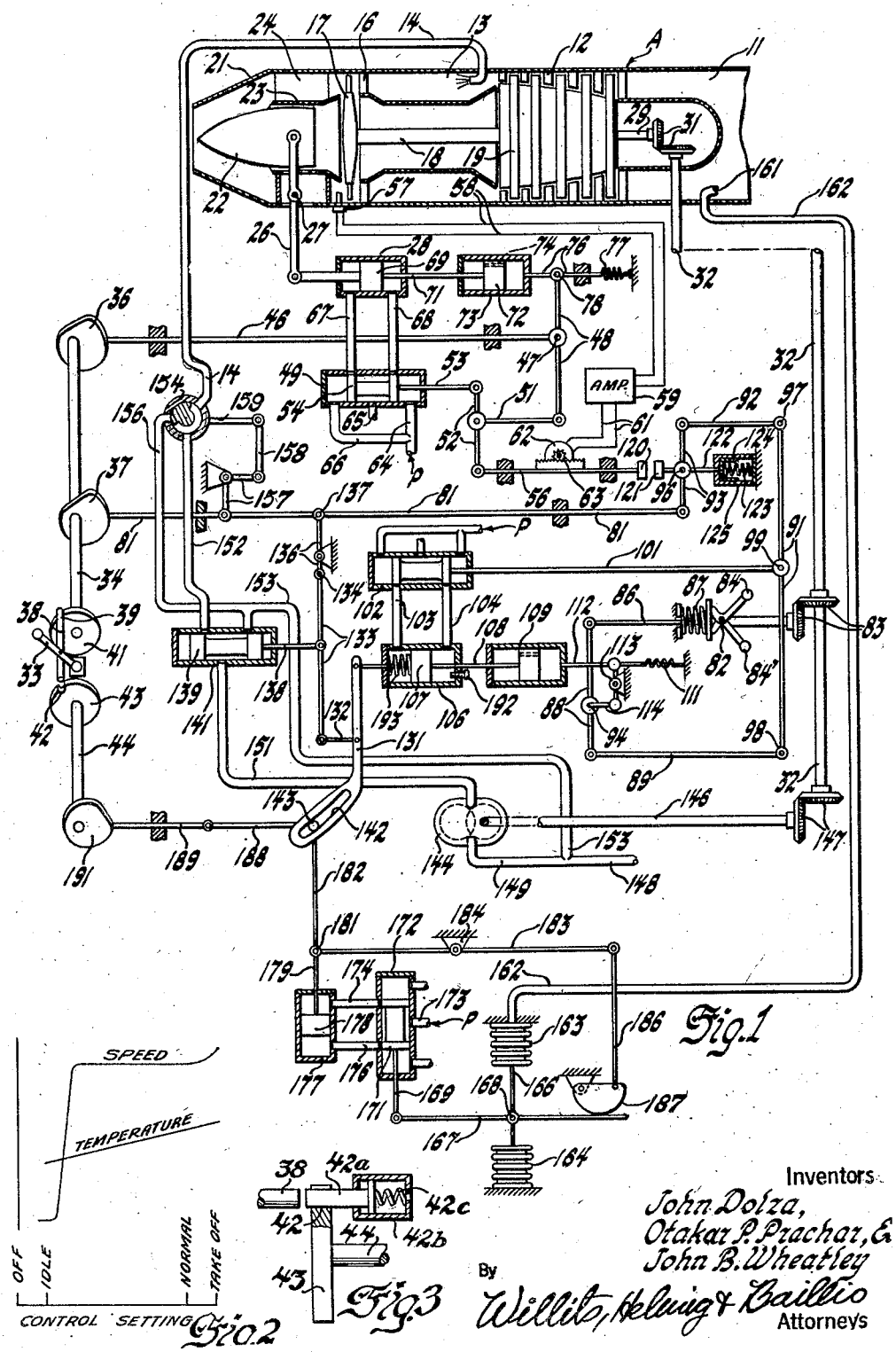
Inventors
John Dolza,
Otakar P. Prachar, &
John B. Wheatley
By
Willits, Helmig & Baillio
Attorneys United States Patent Office 2,820,340
Patented Jan. 21, 1958

2,820,340

TURBOJET ENGINE FUEL AND NOZZLE CONTROL SYSTEM

John Dolza, Davisburg, Mich., and Otakar P. Prachar and John B. Wheatley, Indianapolis, Ind., assignors to General Motors Corporation, Detroit, Mich., a corporation of Delaware Application December 30, 1952, Serial No. 328,696

9 Claims. (Cl. 60—35.6)

Our invention relates to controls for turbojet engines. The purpose of the invention is to provide for scheduling of engine operation so that it operates properly under various conditions of power demand and ambient conditions, so that fuel is metered to the engine to provide the desired power output, so that temperatures in the engine are regulated as desired to obtain best results in terms of efficiency and long life of the power plant; and to provide for emergency control in the event of failure of the primary control system. The primary objects of the invention are to provide a control which fulfills the requirements set out above and which is simple and reliable.

Gas turbine controls, particularly those for aircraft engines which operate over a wide range of altitude, have become extraordinarily complex. This results in part from the nature of gas turbine engines, which require precise coordination of fuel feed to engine operating conditions and ambient conditions to prevent overheating of the turbine on the one hand or flame-out on the other. It is also due to the acceleration characteristics of such engines. Very rapid changes in engine power are desirable for better control of the aircraft, but are difficult to obtain because of the possibilities of compressor surge or loss of combustion if changes are made more rapidly than the engine can tolerate.

The control system of the invention accomplishes a flexible and efficient control with a minimum of mechanism. Briefly, it embodies a control for a variable jet exhaust nozzle as well as control of fuel fed to the engine, including means by which the rotational speed of the engine and the turbine temperature are held to the desired values and within safe limits. It includes, as part of this combination, means for modifying fuel flow of the engine in response to changes in the pressure of air flowing to the engine particularly for idling conditions, and includes an arrangement for emergency control by which this pressure responsive means may assist in controlling the engine in the event of failure of the main control system.

The nature of the invention, the advantages thereof, and the objects may be better understood by reference to the accompanying drawings and the succeeding detailed description of the preferred embodiment of the invention.

Fig. 1 is a schematic diagram of the control system.

Fig. 2 is a chart illustrating a typical control schedule.

Fig. 3 is a schematic illustration of a cam shaft latch.

Referring to Fig. 1, the controls are shown as operatively connected to a turbojet engine A which is illustrated rather diagrammatically, since the engine may be of conventional type and the details of the engine are immaterial to the invention. The engine illustrated comprises an air intake 11 supplying an axial flow compressor 12 which delivers compressed air to a combustion apparatus 13 to which fuel is supplied through fuel line 14, the fuel being sprayed or diffused into the air. The fuel is burned in the combustion chamber and the combustion products are directed by nozzle vanes 16 to a turbine wheel 17 which is connected by a shaft 18 to the rotor 19 of the compressor. Gases exhausted from the turbine are discharged to atmosphere through a jet nozzle 21, the area of which may be varied by a slidable plug or "bullet" 22 movable axially of the engine. The plug 22 may slide in an annular casing 23 defining the inner wall of the turbine exhaust duct supported in the outer casing of the engine by struts 24. The plug 22 may be adjusted axially in any suitable manner and, as here shown, is moved by a lever 26 coupled to the plug 22, extending through one of the struts, and having a fulcrum at 27. The lever 26 may be actuated by a conventional double-acting hydraulic cylinder and piston assembly 28, 69. The turbine also drives, through a shaft 29 extending forwardly from the compressor and bevel gears 31, a shaft 32 extending from the engine which may drive various auxiliary devices.

It will be understood that the structure so far described may be regarded as conventional and is shown to provide a basis for an understanding of the control system of the invention.

In the normal operation of the control system of the invention, both engine temperature and engine rotational speed are coordinately scheduled but more or less independently controlled, in that separate control means are provided for temperature and speed which normally do not interact upon each other in the control system as such. However, these controls are interrelated through the operation of the engine. The temperature control means responds to a selection by the pilot of the desired gas temperature, and includes means responsive to turbine outlet temperature or the like which actuates the plug 22 to vary the area of the exhaust nozzle. The speed responsive control operates in response to a pilot's engine speed signal which acts in connection with a speed responsive device driven by the engine to vary the fuel flow.

The temperature and speed controls interact upon each other because, if the area of the nozzle is varied, this will affect engine speed and thereby fuel flow; and conversely, fuel flow influences temperature and thereby nozzle area. There is an additional link between the temperature and speed controls in that the temperature responsive system operates an overriding control to reduce the fuel supplied if excessive temperature occurs.

The temperature and speed responsive controls are coordinated according to a desired schedule which is devised to suit the characteristics of the engine and are varied simultaneously according to the schedule so that the pilot does not control each independently, but controls both concurrently by movement of the pilot's power control lever.

Referring to Fig. 1, the pilot's power control lever 33 is mounted for rotation about the axis of a control shaft 34 on which are mounted a temperature control signal cam 36 and a speed control signal cam 37. The lever 33 normally is coupled to the shaft 34 by a disengageable coupling which may be of any suitable type. As illustrated schematically, this coupling involves a dog or actuator 38 moving with the pilot's control lever which may engage in a notch 39 in a disk 41 mounted on the cam shaft 34. The control lever 33 may also be moved transversely to its rotational movement about the shaft 34 so that the dog 38 engages in a notch 42 of a disk 43 mounted on the emergency control shaft 44. Conventional means are provided to hold the disks 41 and 43 and thereby the shafts 34 and 44 in their normal datum position unless they are engaged by the actuating member 38, so that when the pilot selects either shaft for control of the engine the other shaft remains in its datum position. The shafts 34 and 44 could, of course, be moved by individual control levers so interlocked that neither one can be moved from the datum position unless the other is in that position.

The means for latching the cam shafts 34 and 44 in the datum position, unless they are engaged by the dog 38 on the control lever 33, may be identical. An elementary latch device for one of the shafts is shown in Figure 3. A plunger 42a, normally projected by spring 42c mounted in a fixed housing 42b, may engage the notch 42 of disk 43 to hold it in the datum position. If the control lever 33 is moved to engage dog 38 in notch 42, the dog pushes plunger 42a out of the notch. The lever 33 may then rotate disk 43 to any desired position. When disk 43 is returned to the datum position and dog 38 is shifted into engagement with disk 41, the plunger 42a is moved back into the notch by spring 42c. It will be understood that the details of the latch structure are immaterial to our invention.

Proceeding to a more detailed description of the controls, it may be best first to discuss the temperature responsive control actuated by the cam 36. The cam 36 is coupled in any suitable manner to actuating member or rod 46, illustrated as reciprocably mounted in fixed guides, so that rod 46 may be positively moved in either direction by the cam 36. The rod 46 is articulated at 47 to a floating lever 48, one end of which is coupled by a link 51 to an intermediate point of a second floating lever 52. One end of the lever 52 is coupled by rod 53 to the spool or piston 54 of a servo valve 49 which controls the power cylinder 28. The other end of lever 52 is articulated to a slidably mounted member 56 by which the engine temperature signal, or response, is fed into the control mechanism. The actual temperature signal is derived from one or more thermocouples 57 which may be mounted in the turbine exhaust duct and are connected by leads 58 to a servo control amplifier 59 which may be of suitable known type. This amplifier controls the supply of power through leads 61 to a motor 62 which, through gearing such as the rack and pinion mechanism 63, reciprocates the temperature response input member 56.

The valve 49 is preferably a conventional balanced reversing valve to which hydraulic actuating fluid is supplied under pressure from any suitable source (not shown), indicated by the letter P and the arrow, through conduits 64, 66, and from which fluid is exhausted to the reservoir or sump (not shown) by the discharge line 65. The valve 49 is connected by lines 67 and 68 to the ends of the cylinder 28. When the spool is in neutral position as shown, the fluid is locked in the cylinder 28 to hold the piston 69 in position. By reciprocation of the valve spool 54 to the right, the piston 69 is moved to the right, and when the valve member moves to the left, the piston 69 moves to the left.

The response to temperature signals is stabilized by the following mechanism. The piston 69 is coupled by a rod 71 to a dashpot piston 72 reciprocable in a closed cylinder 73. A small orifice or bleed opening 74 in the piston permits flow of fluid between the ends of the dashpot cylinder, but develops a pressure differential across the piston upon relative movement of the dashpot piston and cylinder. The dashpot cylinder 73 is slidably mounted and coupled by a rod 76 to a spring 77. The rod 76 is also articulated to one end of the floating temperature input lever 48. The spring 77 is normally unstressed, but movement of the dashpot piston developing a pressure difference across the piston will cause the dashpot cylinder to move in the same direction as the piston, compressing or extending the spring 77 temporarily until the movement of the dashpot piston ceases and the spring returns to its unstressed condition by moving the dashpot cylinder. It will thus be seen that the deflection of spring 77 and the displacement of the end 78 of the lever 48 are a function of the rate of movement of the power piston 69 and plug 22. The dashpot and spring 77 thus provide a feedback indicative of the rate of movement of the piston and are coupled into the system so as to provide a delayed response to prevent overcontrol.

The operation of the temperature control system may now be described, assuming that the engine is in operation and the temperature is that called for by the cam 36.

Assuming that the pilot operates lever 33 so as to call for higher temperature, the rod 46 will move to the right. The pivot 78 is temporarily stationary, likewise the temperature feedback slide 56. Movement of the rod 46 will move the valve spool 54 to the right, causing the piston 69 to move to the right and move the plug 22 to the left, thereby decreasing the area of the nozzle. When the area of the nozzle decreases, the increase in back pressure in the turbine exhaust will increase the temperature of the exhaust gases. This condition will be sensed by the thermocouple 57 which, through amplifier 59 and motor 62, will move the slider 56 to the right as the temperature increases. This movement will rock the lever 52 to move the valve spool 54 back toward its neutral or closed position so that, when the temperature reaches the value called for by the cam 36, the motion of the plug 22 will be stopped and the system will be in equilibrium and stationary at the higher temperature.

This action is modulated or delayed to prevent overcontrol by the action of the dashpot. As the plug 22 moves to close the nozzle, the dashpot moves to the right, compressing spring 77 and rotating lever 48 clockwise about its pivot 47, which tends to move the valve 54 toward closed position. As the motion of the piston 69 slows down, the displacement of the point 78 decreases accordingly, and as the system approaches equilibrium the point 78 returns to its normal position. The dashpot feedback thereby provides an additional signal to the control valve proportional to rate of change which acts as a negative feedback in the system to prevent overrun with possible over-temperature or control oscillation resulting in unstable operation.

As will be apparent, if the temperature signal from the cam 36 is to lower the temperature, the same sort of action will take place with parts operating in the opposite direction to that just described. If temperature changes with no change in the position of cam 36, the thermocouple 57 will operate motor 62 to cause adjustment of nozzle area in the obvious manner.

Before proceeding to a discussion of the interrelation of the temperature and speed control systems, the speed or fuel control system will be described. This system responds to a signal transmitted by the cam 37 which moves a slide rod 81 in both directions through a conventional connection of any suitable sort. The member 81 thus transmits the speed input signal, and a speed responsive device illustrated as a conventional flyball governor 82 transmits the follow-up or response signal indicative of actual engine speed. The flyball governor may be driven by gearing 83 from the engine-driven shaft 32. When the engine speed increases, the flyballs 84 move outwardly and, through the bell-crank levers on which they are mounted, move a speed response rod 86 which is biased toward the right by spring 87. Thus, when the speed increases, the rod will move to the left in the figure. The speed rod 86 is coupled to one end of a floating lever 88, the other end of which is coupled by a link 89 to one end of a further floating lever 91. The opposite end of the floating lever 91 is coupled by a link 92 to one end of a floating lever 93, the other end of which is articulated to the speed input signal rod 81. The fulcrums 94 and 96 of the floating levers 88 and 93, respectively, may be considered for the present to be stationary. As will be seen, therefore, movement of the rod 81 to the right, which signals for an increase in speed, will move the upper end 97 of the floating lever 91 to the left through the lever 93 and link 92. Increase in speed of the engine will move the lower end 98 of the floating lever 91 to the right through the operation of the flyball governor, speed rod 86, the floating lever 88, and the link 89.

An intermediate point 99 of floating lever 91 is coupled through rod 101 to a second servo valve 102, which may be identical with the valve 49 previously described and may be supplied with hydraulic fluid under pressure, as indicated by the letter P, from the same source. The valve 102 supplies hydraulic fluid through lines 103 and 104 to the fuel feed control servo cylinder 106. With the valve 102 in neutral position, as illustrated, the piston 107 of the cylinder 106 is held in fixed position and, if the valve is displaced in either direction, the piston 107 moves in the same direction.

Piston 107 is connected through a rod 108 to a dashpot device 109 which may be identical to the dashpot 72, 73, previously described, the dashpot cylinder being slidably mounted and being biased to a neutral position by spring 111 corresponding functionally to the spring 77 previously described. The reciprocable member 112 which couples the dashpot to the spring is coupled to an intermediate point 94 of the floating lever 88 by a rocker arm 113 and link 114.

Deferring for the present a description of the means by which the piston 107 controls the rate of supply of fuel, it is sufficient to note that movement of the piston to the left in the figure tends to increase the flow of fuel to the engine and movement to the right tends to decrease the flow.

It will be apparent that the manner of control of the piston 107 is much like that of the jet nozzle control piston 69. The speed signal transmitted by the cam 37 through the rod 81, floating lever 93, and link 92 to the floating lever 91 moves the upper end of the lever to the left for an increase speed signal, thereby moving the piston 107 to the left to increase the fuel supply and thus increase the power generated and thereby the rotational speed of the engine. Increase in speed, through the flyball governor 82, moves the rod 86 to the left and rod 89 to the right, moving the lower end and the mid-point of lever 91 to the right to end the movement of the fuel control piston 107 when the speed reaches the value called for. The dashpot 109 acts to delay the response of the piston by a negative feedback action such as that described in connection with the dashpot 72, 73. When the piston 107 moves to the left to increase fuel supply, the dashpot cylinder 109 will move to the left and, through the rocker arm 113 and the link 114 which is coupled to the mid-point 94 of the floating lever 88, will transmit a temporary signal simulating an actual increase in speed to create a movement of the valve 102 to provide a lag in the movement of the piston 107. Obviously, if the signal is to decrease speed, the mechanism will operate in reverse direction to decrease the fuel supply. It will also be apparent that, with a constant speed setting, any deviation from the selected speed will cause the governor 84 to actuate the valve 102 and cylinder 106 to increase or decrease the fuel supply to bring the speed back to its desired value.

We may now consider the connection between the temperature response system and the fuel control system which acts as an overriding control whereby an overtemperature condition in the turbine exhaust will directly reduce the fuel feed. As previously stated, the higher the temperature sensed by the thermocouple 57, the farther the slide 56 is moved to the right in the figure by the amplifier 59 and motor 62. The right-hand end of slider 56, as shown, bears a disk 120 which may engage a similar disk 121 on the end of a reciprocably guided plunger 122 on which the lever 93 is fulcrumed at 96. The sliding member 122 is biased to the position shown by suitable mechanism such as a compression spring 123 urging a slide 124 to its leftward limit of travel in a housing 125. This defines the normal position of the fulcrum 96, and the contacting members 120 and 121 are normally out of engagement with each other. However, if temperature exceeds the stipulated limit, the member 120 will move sufficiently to the right to bear against the member 121 and move the fulcrum 96 to the right against the force of spring 123. As will be seen, this shifting of the fulcrum 96 will cause the upper end of lever 93 to move to the right, moving the link 92 and lever 91 to the right, in the same sense as a decrease speed signal from the cam 37, and will move the piston 107 to reduce fuel rate.

Proceeding now to the description of the fuel supply system and the manner in which the quantity of fuel is controlled by the piston 107, this piston is coupled to one end of a floating lever 131, a central point of which is coupled by a link 132 to one end of a floating lever 133. The other end of lever 133 is articulated at 134 to a rocker arm 136, the other end of which is pivoted at 137 to the speed control rod 81. A central point of floating lever 133 is articulated to rod 138 which operates the spool-shaped movable valve member 139 of a throttle valve 141 which directly controls the rate of supply of fuel. Returning to the floating lever 131, it will be noted that the lower end of this lever is formed with a cam slot 142 obliquely disposed to the general trend of the lever. A follower 143 riding in the slot provides the normal fulcrum for the lever 131. The cam follower 143 may be moved in both vertical and horizontal directions as illustrated in the drawing by mechanism to be described which provides for correct fuel flow for idling conditions and also provides for emergency fuel control. For the present, however, we may consider the point 143 as a fixed fulcrum.

Fuel is supplied to the throttle valve 141 by a positive displacement pump 144 driven through shaft 146 and gearing 147 from the engine driven shaft 32. Fuel is supplied to the pump from any suitable source (not shown) through lines 148 and 149, and is discharged from the pump into the throttle valve through line 151. The throttle valve, which may be of the balanced spool type illustrated, is provided with two sets of discharge ports which are connected respectively to an engine fuel supply line 152 and a by-pass line 153, which returns fuel pumped in excess of the engine requirement to the pump intake. As will be apparent, in the position shown, the valve spool 139 partially opens both sets of ports; if it is moved to the left, the by-pass will be closed and the engine fuel line 152 will be opened; and vice versa. Thus, the fuel may be apportioned between the engine supply and the by-pass. By providing a valve of this type, it is not necessary to provide a relief valve for the pump since, as the discharge line is closed, the by-pass line opens. Line 152 connects to the engine fuel supply line 14, previously described, through a manually operated fuel shut-off valve 154. This valve, which may be a conventional three-way valve, couples the line 152 to the line 14 or by-passes the discharge from the pump through a line 156 to the pump inlet. Valve 154 may be operated from the pilot's control lever 33 by any suitable mechanism, preferably, by the cam 37 and rod 81 through a bell-crank lever 157 fulcrumed on a fixed pivot and a link 158 coupling the bellcrank lever to an operating lever 159 of the valve 154.

We may now consider the operation of the fuel return without reference to the modifying effect of movement of the fulcrum 143 of the lever 131. If a signal calling for increased speed is transmitted by the cam 37, the fuel control piston 107 will be moved to the left as previously described. This will cause counterclockwise movement of the lever 131 about the fulcrum 143, moving the lower end of lever 133 to the left to open the throttle valve by moving it to the left, thus restricting the by-pass 153. The increased speed movement of the rod 81 to the right, acting through rocker-arm 136, also moves the upper end of lever 133 to the left to open the throttle. The throttle is thus actuated cumulatively by the direct action of cam 37 and by the speed follow-up system. With the throttle opened farther, additional fuel will flow to the engine and its speed will increase. As the speed increases, the governor 84 acts through the follow-up mechanism, as previously described, to move the piston 107 to the right, thus tending to close the throttle and increase the area of the by-pass so that the governor acts to regulate the throttle to limit the engine speed and hold it at the setting called for by cam 37.

In the operating speed and power range of the engine the temperature and speed controls described provide the entire control under normal circumstances and are entirely sufficient for this purpose. However, temperature and governor controls are not so well suited for operation of the engine under idling conditions. Operation under idling conditions in the control system of the invention is accomplished primarily by an air pressure response which meters the fuel in accordance with the pressure of air entering the engine so as to maintain a desired fuel rate to provide satisfactory idling with the maximum economy of fuel. Provision of this air pressure control, which may be referred to as a barometric control, is also utilized in the system according to the invention to provide a barometric compensation for a manual throttle setting, so that this manual throttle setting may be used as an emergency control in the event of casualty to the main fuel control system previously described.

A pressure probe 161 in the air inlet 11 senses total pressure, which is transmitted through a line 162 to a bellows or Sylphon device 163, one end of which is fixed. Bellows 163 is mounted in opposed relation to an evacuated bellows 164 also mounted on a fixed structure, so that variations in pressure sensed by the probe 161 cause expansion and contraction of the bellows 163 and reciprocate a rod 166 interconnecting the free ends of the bellows. A floating lever 167 is articulated at 168 to the rod 166 and one end of the lever is coupled by a rod 169 with a movable member 171 of a servo valve 172. This valve may be of the same type as valves 49 and 102 but is illustrated for convenience as being of the type in which the hydraulic fluid from the above-mentioned source is supplied to the center of the valve through a single conduit 173 and the return fluid is exhausted from both ends of the valve. Valve 172 is connected by conduits 174 and 176 to the ends of an actuator cylinder 177 within which is a piston 178. The piston rod 179 is articulated at 181 to a link 182 at the other end of which is mounted the movable fulcrum of lever 131. The piston rod is articulated at 181 to one end of a follow-up control rocker arm 183 fulcrumed at 184. The other end of the rocker arm 183 is coupled by a link 186 to a rotatable cam 187 which bears on the right-hand end of the floating lever 167. If atmospheric pressure increases, the bellows 163 will expand, moving pivot 168 and valve plunger 171 downwardly, and pressure fluid will be admitted below the piston 178 to move it upwardly, thereby shifting the movable pivot 143 upwardly. Movement of the piston 178 will also, through arm 183 and link 186, rotate cam 187 to provide a restoring motion or feedback so that the position of the piston 178 is determined by the pressure sensed. The cam 187 is formed to provide a suitable relation between ambient pressure and position of the piston 178.

The movable fulcrum 143 is also supported by a link 188 articulated to a rod 189 reciprocated by the emergency control cam 191 mounted on shaft 44. In normal operation the cam 191 is locked in its datum position and, therefore, the rod 189 may be regarded as providing a fixed pivot for the link 188. Thus, if the air pressure increases at the compressor inlet, the fulcrum 143 will move upwardly, camming the lower end of floating lever 131 to the left and thereby directly opening the throttle valve through link 132 and lever 133. Any action of the barometric control which changes engine speed will be immediately compensated by action of the governor 84 so far as necessary to maintain the preselected engine speed in normal operation of the system.

However, the barometric control is the basic control when the engine is operating under idling conditions. This is an advantage, because it gives better results than governor control. Under idling conditions, the primary fuel control is effected by the barometric device and the cylinder 177 acting on the lower end of lever 131. This may be explained as follows: With idling conditions in effect the rod 81 is moved so far to the left that it transmits a very low speed signal below the desired idling speed of the engine. This being the case, the input from the governor moves the fuel control piston 107 to the right. As a result, the piston assumes a position determined by an adjustable stop shown as a screw 192 in the head of cylinder 106. The piston 107 thus comes to rest and the upper end of lever 131 becomes a fixed fulcrum. The amount of fuel supplied to the engine is, therefore, determined by the adjustable fulcrum 143 in accordance with the pressure of the air supplied to the engine. In this way the fuel supply may be proportioned to the air in such a manner as to insure continued operation with a minimum supply of fuel, so that fuel is not wasted during idling conditions. As will be apparent, the greater the air pressure, the more the piston 178 will move up, as previously described, to move the lower end of lever 131 to the left and thus open the throttle to increase fuel supply. It will be apparent that the contours of the cams 187 and 142 may be adapted to the characteristics of any given engine to secure the desired fuel-air ratio over a wide range of ambient atmospheric conditions to secure proper idling.

Under idling conditions, the temperature signal transmitted by the cam 36 and slider 46 will be for a lower temperature than that resulting from engine operation, so that the exhaust nozzle will be held wide open.

A compression spring 193 in the cylinder 106 constantly urges the piston 107 toward the stop 192. This tends to set up a slight creep of the piston due to leakage of hydraulic fluid in the piston or in the valves, which will be compensated by the servo system, which operates valve 102 to hold the piston 107 in proper position except under idling conditions. When the engine is shut down, the piston 107 will be returned to the idling position regardless of the position of the valves.

We may now consider the emergency operation of the system, which may be resorted to in the event of failure of the main control system such as might result from failure of the governor or temperature amplifier, for example. In the event it is desired to resort to emergency control, the pilot's control lever 33 is returned to the datum position and is shifted downwardly as viewed in Figure 1, so that the connecting member 38 engages the notch 42 in disk 43. This will release the latch which normally holds the shaft 44 in position and the shaft 34 will be locked. Then, by advancing the lever 33, the cam 191 will be rotated clockwise to increase the power setting. The follower 189 will be pulled to the left in the figure and through the link 188 will move the fulcrum 143 to the left. This will act through lever 131, link 132 and lever 133 to open the fuel valve progressively as the control lever is moved forward. Since the cam 37 is locked, rod 81 will be held stationary and rocker arm 136 will hold the upper pivot 134 of lever 133 stationary. The actual setting of the throttle valve under these conditions will be a resultant of the setting of the power control lever and of the barometric control actuation. As will be apparent, the greater the air pressure, the more the fulcrum 143 will be moved upwardly. This movement, because of the skew relation of the slot 142, acts directly to increase fuel flow. It also decreases the lever arm between pivot 143 and the upper end of lever 131, which is held fixed by the spring 193 holding the piston 107 against the stop 192, so that the greater the air pressure becomes, the greater the throttle opening for given movement of the control lever 33.

Therefore, the barometric control compensates for air pressure so that, even in emergency control, the control setting is corrected to secure operation of the engine at the desired fraction of its available power under extant ambient given conditions.

It is believed that the general operation of the system will be clear from the foregoing, but it may be desirable to review it briefly in connection with Fig. 2, which figure indicates in a general way the preferred coordination of temperature and speed of the engine. Of course, the actual coordination can be whatever is deemed best in view of the characteristics of a particular engine, and the nature of the control regime may be varied by varying the contours of the cams 36 and 37 or in other ways.

When the control lever 35 is in the "off" position, the fuel valve 154 is closed and the engine is entirely out of operation. With the lever moved ahead to the "idle" position or above, valve 154 is open to permit fuel to flow to the engine. The "idle" position calls for operation close to the minimum self-sustaining condition of engine operation, but normally sufficiently above the absolute minimum to assure consistent idling operation and readiness for acceleration into the normal operating range. In the "idle" position of the control, when the engine is running, the speed is low, perhaps 40 percent of normal engine speed, and the engine temperature, that is the turbine outlet temperature for example, is as low as is consistent with engine operation. Under idling conditions the temperature signal transmitted is for a temperature below the actual engine temperature so the exhaust nozzle is held wide open. The signal to the governor also is below the actual idling speed of the engine so that the governor is ineffective. The throttle control piston 107 comes up against the stop 192 and the actual control of fuel is accomplished by the inlet pressure responsive or barometric system. The operating range of the engine for propulsive purposes is in the range from the "idle" point to the "normal" point, which is near the other end of the travel of the control lever. Preferably, the cams are scheduled so that the engine thrust increases approximately linearly over this range. The speed over the range is preferably maintained substantially constant at the most efficient operating speed of the engine, so that the time required for acceleration of the engine does not delay reaching a desired increase in power, and the speed rises rapidly when the lever is first moved from the idle position and is maintained at its desired value by the governor 82. The temperature signal is a gradually increasing one from the "idle" position over the normal operating range up to the "normal" point. The cam 36 thus transmits a gradually increasing temperature signal with movement of the control lever for greater power. The increasing temperature is, of course, accompanied by increasing thrust of the engine. When increased temperature is called for, the result is a closing to some extent of the exhaust nozzle which increases the turbine back pressure and thus tends to slow down the turbine. The governor responds to this by increasing the fuel supply so as to maintain the desired speed and the jet nozzle is ultimately adjusted to a value which maintains the desired turbine temperature. For take-off, the control lever is moved to the extreme end of its range to run the engine at slightly over its maximum continuous rating. At the "take-off" setting, the governor setting is increased slightly as well as the temperature setting, as will be apparent from the speed and temperature curves. If it is desired to shut the engine down, the control lever is moved back to the "off" position which positively shuts off fuel from the engine.

In case of some operational failure of the normal control, the manual control lever 33 may be returned to the "idle" position, which is the datum point previously referred to, and is then shifted into engagement with the operating disk 43 of cam 191 for emergency control. With the camshaft 34 locked in the "idle" position, fixed signals are transmitted by the cams 36 and 37 and the fuel control piston 107 moves against the stop 192. Rotation of the emergency cam shaft forward from "idle" position increases fuel supplied to the engine under modulation by the barometric control device, as previously described.

It will be apparent to those skilled in the art that the control system as described above has many advantages including those of flexibility and simplicity. The description in detail of the preferred embodiment of the invention is not to be considered as limiting or restricting the invention, since many modifications may be made by the exercise of skill in the art within the principles of the invention.

We claim:

1. A fuel control system for a gas turbine engine comprising, in combination, means responsive to the rotational speed of the engine for governing the fuel supplied to the engine under normal operating conditions to maintain a desired operating speed, means responsive to an ambient air condition indicative of engine idling fuel requirements for governing the fuel supplied to the engine under idling conditions of operation, manual control means operating independently of the speed responsive means for controlling the supply of fuel to the engine under emergency conditions, and means actuated by the said ambient air condition responsive means for modifying the operation of the manual fuel supply control means to vary the fuel rate coordinately with the effect of the ambient air condition on fuel requirements.

2. A fuel control system for a gas turbine engine comprising, in combination, means responsive to the rotational speed of the engine for governing the fuel supplied to the engine under normal operating conditions, means responsive to an ambient air condition indicative of engine idling fuel requirements for governing the fuel supplied to the engine under idling conditions of operation, manual control means for controlling the supply of fuel to the engine under emergency conditions, and means actuated by the said ambient air condition responsive means for modifying the operation of the manual fuel supply control means.

3. A control system for a gas turbine engine comprising, in combination, means for supplying fuel under pressure, regulating means for controlling the amount of the fuel supplied to the engine, means responsive to the rotational speed of the engine, means for transmitting a speed control signal, a follow-up means responsive to the two last-mentioned means for actuating the fuel regulating means, means for disabling the follow-up means during engine operation, means responsive to ambient air conditions, and means controlled by the last-named responsive means and interposed between the follow-up means and the fuel regulating means for modifying the fuel flow during idling conditions in accordance with the said ambient air conditions.

4. A control system for a gas turbine engine comprising, in combination, means for supplying fuel under pressure, regulating means for controlling the amount of the fuel supplied to the engine, means responsive to the rotational speed of the engine, means for transmitting a speed control signal, a follow-up means responsive to the two last-mentioned means for actuating the fuel regulating means, and means for establishing a fixed position for the follow-up means for idling operation of the engine.

5. A fuel control system for a gas turbine engine comprising, in combination, means responsive to the rotational speed of the engine for governing the fuel supplied to the engine under normal operating conditions, means responsive to an ambient air condition indicative of engine idling fuel requirements for governing the fuel supplied to the engine under idling conditions of operation, manual control means for controlling the supply of fuel to the engine under emergency conditions, means actuated by the said ambient air condition responsive means for modifying the operation of the manual fuel supply control means, and overriding control means responsive to engine temperature for limiting the fuel supplied to the engine.

6. A fuel control system for a gas turbine engine comprising, in combination, means for supplying fuel under pressure, flow control means for regulating the amount of the said fuel supplied to the engine, means for transmitting a rotational speed signal to the engine, means responsive to the rotational speed of the engine, follow-up means actuated by the two last-mentioned means actuating the flow control means to govern the engine speed in accordance with the speed signal under normal operating conditions, and means for controlling the engine under idling conditions comprising means for limiting movement of the follow-up means in a direction to reduce the fuel sent to the engine, means responsive to a condition indicative of engine idling fuel requirements of air entering the engine, and control means actuated by the last-mentioned means for modifying the fuel supplied to the engine from that established by the said limiting means.

7. A fuel control system for a gas turbine engine comprising, in combination, means for supplying fuel under pressure, flow control means for regulating the amount of the said fuel supplied to the engine, means for transmitting a rotational speed signal to the engine, means responsive to the rotational speed of the engine, follow-up means actuated by the two last-mentioned means actuating the flow control means to govern the engine speed in accordance with the speed signal under normal operating conditions, and means for controlling the engine under idling conditions comprising means for limiting movement of the follow-up means in a direction to reduce the fuel supplied to the engine, means responsive to the pressure of air entering the engine, and control means actuated by the last-mentioned means for modifying the fuel supplied to the engine from that established by the said limiting means.

8. A control system for a gas turbine jet propulsion engine, the said engine comprising a combustion device, means for supplying fuel thereto, an exhaust nozzle, and means for varying the area of the nozzle; the said control system comprising, in combination, means responsive to a temperature in the turbine of the engine, means for transmitting a temperature control signal, and means responsive to the two last-mentioned means for varying the area of the turbine exhaust nozzle to match the measured temperature with the temperature signal; means responsive to the rotational speed of the turbine, means for transmitting a speed control signal, and means responsive to the two last-mentioned means for varying the supply of fuel to the engine to match the rotational speed with the signal; and means for coordinating the transmitted speed and temperature control signals.

9. A control system for a gas turbine jet propulsion power plant, the power plant comprising a combustion section, means for supplying fuel thereto, a variable area exhaust nozzle, and power means for varying the area of the nozzle; the control system comprising means under manual control for generating coordinated temperature and speed control signals for transmission to the engine; means responsive to a temperature in the engine; means responsive to the temperature signal and the measured temperature for varying the area of the nozzle to match the measured temperature with the temperature signal; means responsive to the rotational speed of the engine, means governed by the speed signal and the speed responsive means for controlling the amount of fuel supplied to the engine; overriding control means actuated by the temperature measuring means for reducing the fuel supplied to the engine in the event of over-temperature conditions; means establishing a minimum limit of variation of the fuel controlling means in the direction of diminishing fuel supply, and means responsive to the pressure of air entering the engine for modifying the quantity of fuel supplied to the engine in accordance with the said pressure.

References Cited in the file of this patent

UNITED STATES PATENTS

| 2,077,384 | Dettenborn | Apr. 20, 1937 |
| 2,095,821 | Maas | Oct. 12, 1937 |
| 2,489,586 | Ray | Nov. 29, 1949 |
| 2,520,967 | Schmitt | Sept. 5, 1950 |
| 2,545,703 | Orr | Mar. 20, 1951 |
| 2,545,856 | Orr | Mar. 20, 1951 |
| 2,622,393 | Edwards et al. | Dec. 23, 1952 |
| 2,699,646 | Baker | Jan. 18, 1955 |
| 2,734,340 | Wood | Feb. 14, 1956 |

FOREIGN PATENTS

| 634,095 | Great Britain | Mar. 15, 1950 |
| 990,332 | France | June 6, 1951 |